United States Patent [19]

Eldred

[11] 4,143,754

[45] Mar. 13, 1979

[54] LABELLING MACHINES WITH ARTICLE GUIDE PLATE

[75] Inventor: Paul J. Eldred, Sheffield, England

[73] Assignee: Morgan Fairest Limited, Sheffield, England

[21] Appl. No.: 813,449

[22] Filed: Jul. 7, 1977

[51] Int. Cl.$^2$ ............................................. B65G 29/00
[52] U.S. Cl. ................................... 198/379; 156/567; 156/DIG. 26; 156/DIG. 27; 198/480
[58] Field of Search ............... 198/379, 480, 479, 645, 198/694; 214/1 BC, 151; 156/567, DIG. 26, DIG. 27

[56] References Cited

U.S. PATENT DOCUMENTS 2,822,943  2/1958  Fedorchak .................... 198/379 X
3,378,129  4/1968  Mencacci ....................... 198/480

Primary Examiner—James B. Marbert
Assistant Examiner—Douglas D. Watts
Attorney, Agent, or Firm—Lowe, King, Price & Becker

[57] ABSTRACT

A labelling machine has each of a number of article supporting plates mounted in a rotary table for movement within a recess in a guide plate when a clamp presses an article against a spring urging the supporting plate to a position flush with the guide plate, and the supporting plate has a plurality of peripheral notches making a sliding fit with projections on the guide plate extending into the recess and having surfaces converging towards each other in the direction away from the clamp, whereby each article coming into contact with the converging surfaces of the projections as the clamp pressing the article causes the supporting plate to move into the recess in the guide plate against the spring urge results in the article being moved into a definite position on the supporting plate in relation to its cross-sectional shape.

6 Claims, 7 Drawing Figures

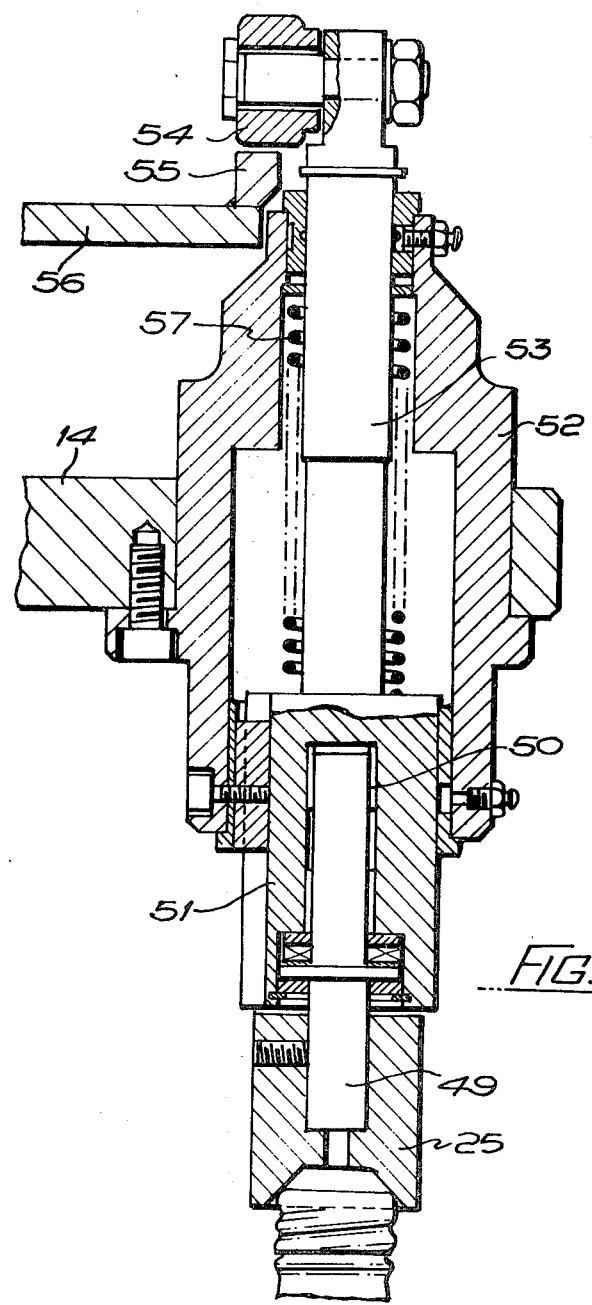

LABELLING MACHINES WITH ARTICLE GUIDE PLATE

This invention relates to labelling machines and has for its object the provision of means for accurately aligning an article to be labelled, e.g. a bottle, especially having a non-circular cross-section.

According to the present invention, a labelling machine comprises an article supporting plate, a clamp for pressing an article to the supporting plate, a guide plate with a recess within which the article supporting plate can move against a spring urge when the clamp moves towards the supporting plate to press an article to it, a plurality of notches spaced round the periphery of the article supporting plate, and a corresponding number of projections on the guide plate extending into the recess and making a sliding fit in the notches in the article supporting plate, with the surfaces of the projections facing the clamp converging towards each other in the direction away from the clamp. Thus an article pressed to the supporting plate causes that plate to move into the recess in the guide plate against the spring urge, and the periphery of the article on the supporting plate comes into contact with the converging surfaces of the projections on the guide plate to move the article into a definite position on the supporting plate in relation to its cross-sectional shape.

The general shape of the article supporting plate and of the recess in the guide plate may be similar to but slightly larger than the cross-section of the article, but it will be the number and inclination of the projections that determines the final position of the article on the supporting plate.

The guide plate preferably has a counterbore between the recess and a tapped bore, with a coil compression spring housed in the counterbore, and the article supporting plate has a bore for the shank of a bolt screwed into the tapped bore in the guide plate, with a head of the bolt housed in a counterbore of the bore in the article supporting plate, whereby the spring urge brings the article supporting plate flush with the guide plate.

The article supporting plate and the guide plate may be provided with detachable facing plates provided with the requisite shape, notches and projections, so as to be interchangeable to suit different cross-sections (both shapes and sizes) of articles.

The guide plate may be one of a number incorporated in a rotary table of the labelling machine, and each guide plate may be rotatably mounted in the table, which is provided with cam and gear means for effecting relative movement of the guide plates as they orbit to bring portions of the articles into appropriate positions for receiving labels from delivery devices.

An embodiment of the invention will now be described, by way of example only, with reference to the accompanying drawings, in which:

FIG. 5 is a fragmentary vertical section through part of the machine higher up than FIG. 4. and indicating a cap on the bottle engaged by a clamp;

Figure 1:
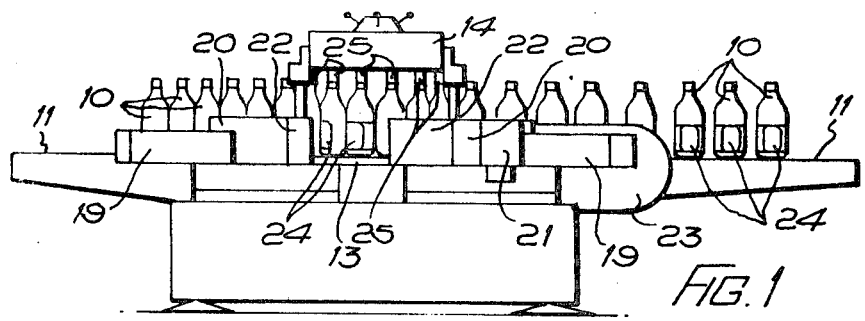
FIG. 1 is a diagrammatic elevation of a bottle labelling machine in accordance with the invention.
Figure 2:
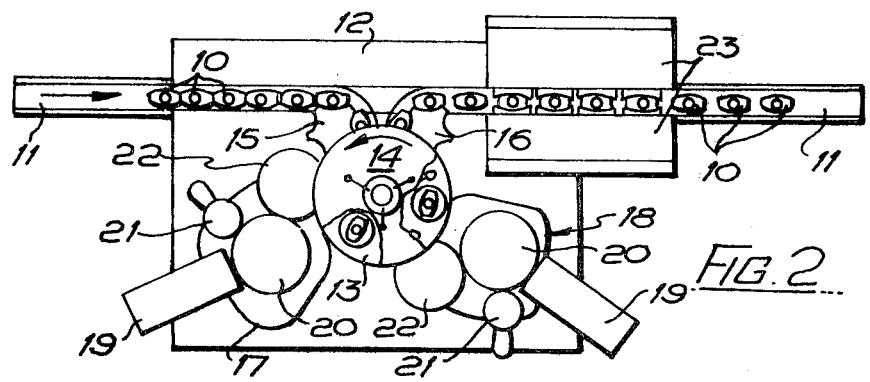
FIG. 2 is a diagrammatic plan of the machine of FIG. 1 with parts broken away to show portions at a lower level.

In FIGS. 1 and 2 bottles 10 are carried into and out of a labelling machine by a conveyor 11 extending across a base 12, which houses a motor, gearbox and drives (not shown) for a rotary support table 13 and clamping head 14, inward and outward starwheels 15, 16 respectively, label delivery devices 17,18 respectively (each of which has a label magazine 19 feeding a pickout device 20 provided with adhesive by a gumming device 21 and transferring gummed labels to a delivery member 22, in known manner), and pressing means 23 for the labels 24 (FIG. 1 only) which have been applied to the bottles.

Figure 3:
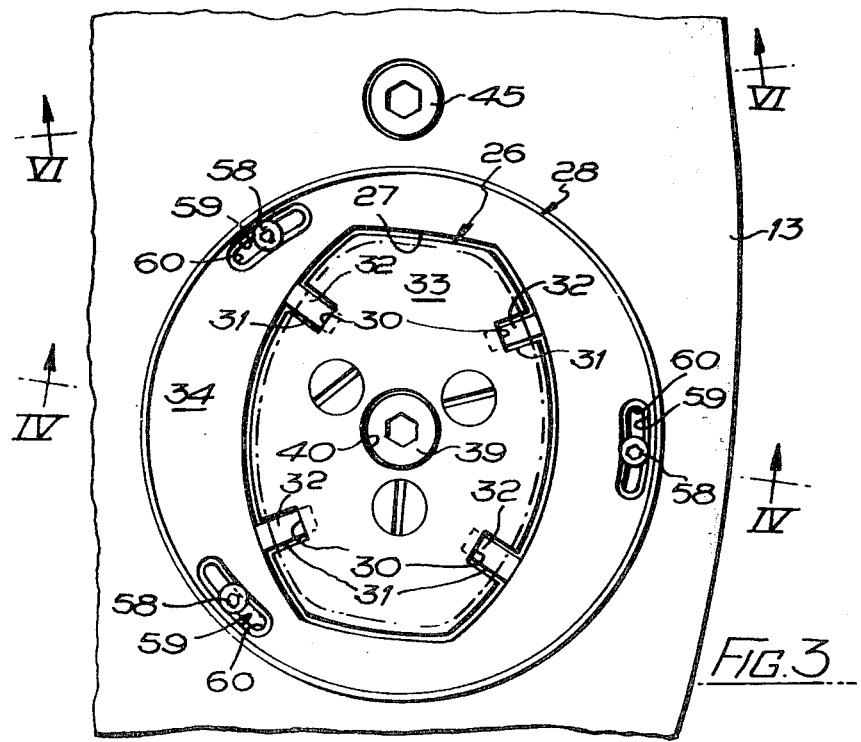
FIG. 3 is an enlarged fragmentary plan corresponding to the right-hand exposed portion of FIG. 2.
Figure 4:
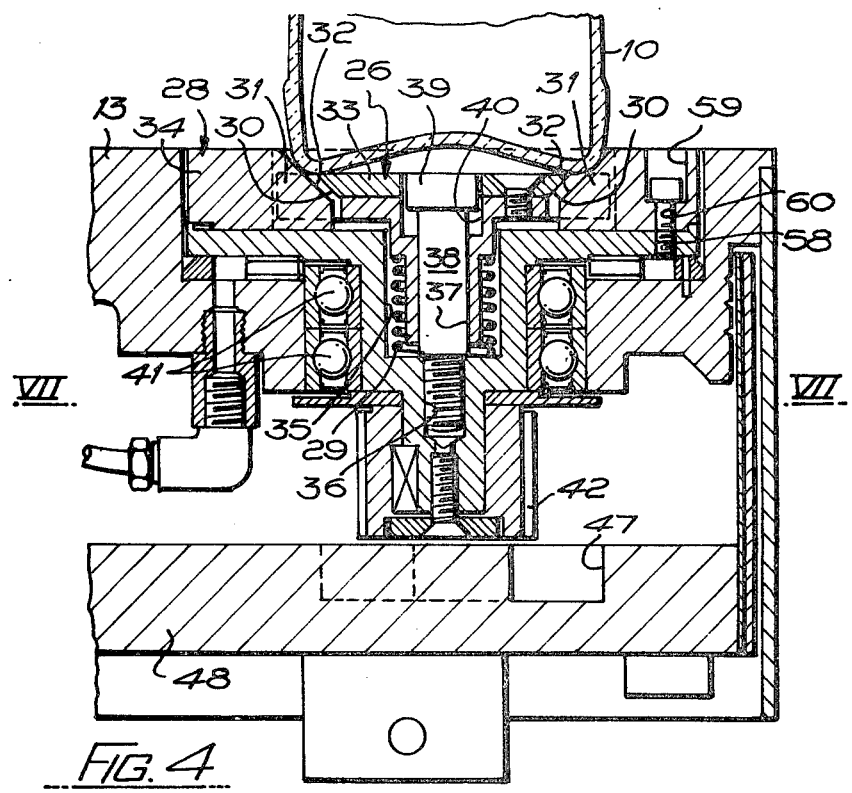
FIG. 4 is a fragmenatry vertical section generally on the line IV—IV of FIG. 3 and indicating a bottle on a supporting plate.

The inward starwheel 15 spaces and times the bottles 10 and delivers them to the support table 13 in alignment below clamps 25 carried by the clamping head 14, and below each clamp 25 (see also FIG. 5) is aligned a supporting plate 26 (see FIGS. 3 and 4) movable vertically within a recess 27 in a guide plate 28, against the urge of a spring 29, when the clamp moves towards the supporting plate to press a bottle to it. Four notches 30 are spaced round the periphery of the bottle supporting plate 26, and a corresponding number of projections 31 on the guide plate extend into the notches, with the surfaces 32 of the projections facing the clamp 25 converging towards each other in the direction away from the clamp. Thus a bottle 10 pressed to the supporting plate 26 by the clamp causes that plate to move into the recess 27 in the guide plate 28, against the spring urge, and the periphery of the bottom of the bottle comes into contact with the converging surfaces 32 of the projections 31 on the guide plate, to move the bottle into a definite position on the supporting plate in relation to its cross-sectional shape (see particularly FIG. 3).

The general shape of each bottle supporting plate 26 and of the recess 27 in the guide plate 28 in similar to but slightly larger than the cross-section of the bottles 10, but it is the number and inclination of the projections 31 that determines the final position of a bottle on a supporting plate. The bottle supporting plate and the guide plate are provided with detachable facing plates 33, 34 respectively provided with the requisite shape, notches and projections, so as to be interchangeable to suit different cross-sections (both shapes and sizes) of bottles or other articles.

Each guide plate 28 has a counterbore 35 between the recess 27 and a tapped bore 36, with the spring 29 housed in the counterbore, and the supporting plate 26 has a bore 37 for the shank of a bolt 38 screwed into the tapped bore 36, with a head 39 of the bolt housed in a counterbore 40, whereby the spring 29 urges the supporting plate towards a position in which its facing plate 33 is flush with the facing plate 34 of the guide plate, when a bottle is not urged downwardly by the aligned clamp 25.

Figure 6:
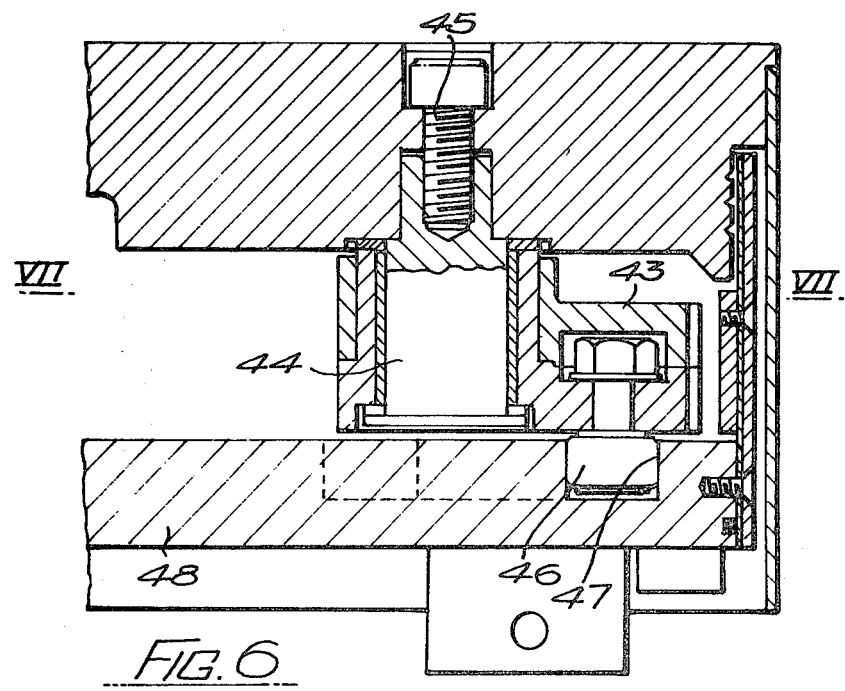
FIG. 6 is a fragmentary vertical section generally on the line VI—VI of FIG. 3.
Figure 7:
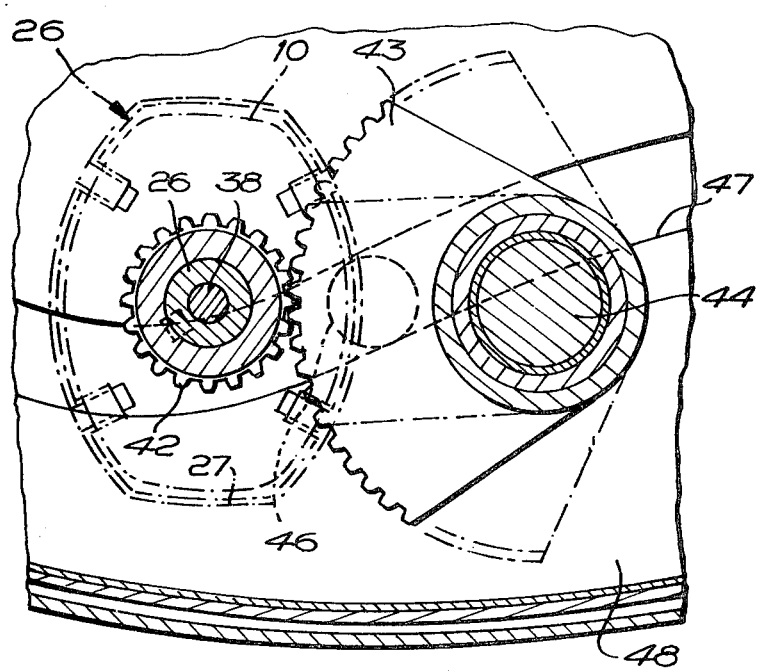
FIG. 7 is a part-sectional fragmentary plan from the level VII—VII of FIGS. 4 and 6, but with the cam and gear means in their dispositions at the left-hand exposed portion of FIG. 2.

Each guide plate 28 is rotatably mounted in bearings 41 in the table 13, and relative movement of the guide plates is effected as they orbit to bring opposite portions of the bottles into appropriate positions for receiving labels 24 firstly from the label delivery device 17 and then from the label delivery device 18. The relative movement is effected by means of a pinion 42 secured to the rotatable guide plate and rotated by a quadrant 43 (see FIGS. 6 and 7) when the latter is rocked about a pivot 44 (which is secured to the table 13 by a screw 45) by a roller 46 following a radial change in the position of a cam groove 47 in a fixed disc 48. The radial change in the position of the cam groove is disposed intermediate the label delivery devices 17, 18 and can be seen clearly in FIG. 7. Each clamp 25 is likewise relatively rotatable with respect to the head 14, by mounting the clamp on a spindle 49 (see FIG. 5) rotatable in bearings 50 in a slide 51 in a housing 52 carried by the head 14. The slide is raised by a plunger 53 carrying a roller 54 following a cam 55 (on another fixed disc 56) except when clamping a bottle 10 to the supporting plate 26 by the urge of a coil compression spring 57 encircling the plunger within the housing 52.

The facing plate 34 (which provides the projections 31) is secured to the guide plate 28 by means of three screws 58 (FIGS. 3 and 4) the heads of which are housed in arcuate grooves 59 at the bottoms of which are corresponding slots, so that the angular disposition of the recess 27 can be finely adjusted for accurate positioning of the labels 24 to the bottles 10.

What I claim is:

1. A labelling machine comprising an article supporting plate, a clamp for pressing an article to the supporting plate, a guide plate with a recess within which the article supporting plate can move against a spring urge when the clamp moves towards the supporting plate to press an article to it, a plurality of notches spaced round the periphery of the article supporting plate, and a corresponding number of projections on the guide plate extending into the recess and making a sliding fit in the notches in the article supporting plate, with the surfaces of the projections facing the clamp converging towards each other in the direction away from the clamp to align the article in a predetermined position on the supporting plate as the clamp moves toward the supporting plate.

2. A labelling machine as in claim 1, wherein the general shape of the article supporting plate and of the recess in the guide plate is similar to but slightly larger than the cross-section of the article.

3. A labelling machine as in claim 1, wherein the guide plate has a counterbore between the recess and a tapped bore, with a coil compression spring housed in the counterbore, and the article supporting plate has a bore for the shank of a bolt screwed into the tapped bore in the guide plate, with the head of a bolt housed in a counterbore of the bore in the article supporting plate, whereby the spring urge brings the article supporting plate flush with the guide plate.

4. A labelling machine as in claim 1, wherein the article supporting plate and the guide plate are provided with detachable facing plates provided with the requisite shape, notches and projections.

5. A labelling machine as in claim 1, wherein the guide plate is one of a number incorporated in a rotary table of the labelling machine.

6. A labelling machine as in claim 5, wherein each guide plate is rotatable mounted in the table, which is provided with cam and gear means for effecting relative movement of the guide plates as they orbit to bring portions of the articles into appropriate positions for receiving labels from delivery devices.

* * * * *